(12) United States Patent
Cantley et al.

(10) Patent No.: US 10,606,536 B2
(45) Date of Patent: Mar. 31, 2020

(54) INTELLIGENT SYSTEMATIC PHYSICAL DOCUMENT FULFILLMENT SYSTEM

(71) Applicant: BANK OF AMERICA CORPORATION, Charlotte, NC (US)

(72) Inventors: Kerry Michelle Cantley, Fort Mill, SC (US); Robert Edward Marshall, Charlotte, NC (US); Geoffrey Reed Williams, Midlothian, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/104,727

(22) Filed: Aug. 17, 2018

(65) Prior Publication Data

US 2020/0057588 A1 Feb. 20, 2020

(51) Int. Cl.
*H04H 60/98* (2008.01)
*H04N 21/24* (2011.01)
*G06F 3/12* (2006.01)
*H04L 12/24* (2006.01)
*G06N 5/02* (2006.01)
*H04N 1/00* (2006.01)

(52) U.S. Cl.
CPC .......... *G06F 3/1264* (2013.01); *G06F 3/1217* (2013.01); *G06F 3/1236* (2013.01); *G06N 5/02* (2013.01); *H04L 41/147* (2013.01); *H04N 1/00244* (2013.01); *G06F 3/1219* (2013.01)

(58) Field of Classification Search
USPC ..... 358/1.1–3.29, 1.11–1.18; 705/50–56, 77, 705/78, 7.22–7.35, 330, 400, 909, 910
See application file for complete search history.

(56) References Cited

U.S. PATENT DOCUMENTS

| | | |
|---|---|---|
| 5,134,496 A | 7/1992 | Schwab et al. |
| 5,315,448 A | 5/1994 | Ryan |
| 5,421,013 A | 5/1995 | Smith |
| 6,009,170 A | 12/1999 | Sako et al. |
| 6,272,283 B1 | 8/2001 | Nguyen |
| 6,314,518 B1 | 11/2001 | Linnartz |
| 6,351,439 B1 | 2/2002 | Miwa et al. |
| 6,606,450 B1 | 8/2003 | Klebanoy et al. |
| 6,643,330 B1 | 11/2003 | Nakagawa et al. |

(Continued)

FOREIGN PATENT DOCUMENTS

| | | |
|---|---|---|
| WO | 199321586 A1 | 10/1993 |
| WO | 199511560 A1 | 4/1995 |

(Continued)

*Primary Examiner* — Marcellus J Augustin
(74) *Attorney, Agent, or Firm* — Michael A. Springs; Moore & Van Allen PLLC; Nicholas C. Russell

(57) ABSTRACT

Embodiments of the invention are directed to a system, method, or computer program product for intelligent systematic physical document fulfillment. Feeding a generated artificial intelligent engine one or more carrier information, geographic information, regulatory information, cost analytics, and/or user analytics in real-time. The invention performs predictive analytic processing for best mode of generation and distribution of physical documents that satisfy the user expectations, regulatory compliance, and efficiency. As such, the invention generates an optimized document printing and distribution schedule for user physical document printing and distribution.

17 Claims, 6 Drawing Sheets

(56) References Cited

U.S. PATENT DOCUMENTS

| | | |
|---|---|---|
| 6,664,976 B2 | 12/2003 | Lofgren et al. |
| 6,785,814 B1 | 8/2004 | Usami et al. |
| 6,985,410 B1 | 1/2006 | Furukawa et al. |
| 7,088,823 B2 | 8/2006 | Fetkovich |
| 7,098,931 B2 | 8/2006 | Patterson et al. |
| 7,203,666 B1 | 4/2007 | Gravell et al. |
| 7,702,585 B2 | 4/2010 | Lyda et al. |
| 8,508,767 B2 | 8/2013 | Carter et al. |
| 8,660,949 B2 | 2/2014 | Li et al. |
| 8,682,479 B1 | 3/2014 | Clupper et al. |
| 8,724,140 B2 | 5/2014 | Tolomei et al. |
| 8,768,858 B1 | 7/2014 | Begen |
| 8,780,382 B2 | 7/2014 | Carter et al. |
| 8,781,959 B2 | 7/2014 | Lawson et al. |
| 8,805,576 B1 | 8/2014 | Clupper et al. |
| 9,064,239 B2 * | 6/2015 | Suzuki ............... G06Q 30/0601 |
| 9,311,671 B2 | 4/2016 | Folk et al. |
| 9,697,493 B2 | 7/2017 | Folk et al. |
| 2002/0030907 A1 | 3/2002 | Ikeda et al. |
| 2002/0131595 A1 | 9/2002 | Ueda et al. |
| 2003/0185125 A1 | 10/2003 | Sako |
| 2003/0215110 A1 | 11/2003 | Rhoads et al. |
| 2003/0235125 A1 | 12/2003 | Akita |
| 2004/0008866 A1 | 1/2004 | Rhoads et al. |
| 2004/0046774 A1 | 3/2004 | Rhoads et al. |
| 2004/0114907 A1 | 6/2004 | Rinaldi |
| 2004/0136536 A1 | 7/2004 | Michtchenko |
| 2005/0271364 A1 | 12/2005 | Collar |
| 2006/0026627 A1 | 2/2006 | Yang et al. |
| 2006/0168630 A1 | 7/2006 | Davies |
| 2007/0033360 A1 | 2/2007 | Kori et al. |
| 2008/0101679 A1 | 5/2008 | Rauh et al. |
| 2008/0239366 A1 * | 10/2008 | Cyman ................... G03G 15/50 358/1.15 |
| 2008/0260199 A1 | 10/2008 | Cowburn |
| 2008/0312952 A1 | 12/2008 | Gulfo et al. |
| 2009/0010550 A1 | 1/2009 | Chang et al. |
| 2010/0312593 A1 * | 12/2010 | Johnston ............ G06Q 30/0205 705/7.34 |
| 2012/0320408 A1 * | 12/2012 | Evevsky ............... G06F 3/1243 358/1.15 |
| 2016/0055222 A1 * | 2/2016 | Sarferaz .................. G06F 16/28 707/603 |
| 2017/0193428 A1 | 7/2017 | Abrams et al. |
| 2018/0131628 A1 | 5/2018 | Castinado et al. |
| 2018/0315141 A1 * | 11/2018 | Hunn ..................... G06F 16/93 |

FOREIGN PATENT DOCUMENTS

| | | |
|---|---|---|
| WO | 199515635 A1 | 6/1995 |
| WO | 2005098832 A2 | 10/2005 |

* cited by examiner

INTELLIGENT SYSTEMATIC PHYSICAL DOCUMENT FULFILLMENT SYSTEM

BACKGROUND

In document fulfillment services physical documents may be required for distribution to individuals on specified times. Furthermore, document fulfillment services continually monitor and manage document printing and distribution fulfillment timing for compliance. As a result, there exists a need for technological integration within a physical document fulfillment service.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for an intelligence systematic physical document fulfillment system.

The invention utilizes artificial intelligence (AI) processing to process mailings systematically for best postage density, value, timing, or the like. In this way, the system is a smart document fulfillment services (DFS) system that triggers specific printing and postage timing for physical mailings. The system reviews when a statement is printed, when it arrives at a user, how long it takes to be delivered, external environmental factors, SLA requirements for the statement, geographic location, keywords identification in media, supply/distribution channels, and the like. Combining this information with identifying delays in postage services, third party delays, volume discounts for postage (with zip code), internal combination of multiple statements to one user, or the like. Using this information, AI may learn and predict for the printing and distribution of mailings systematically for the best value for the entity and/or the customer. In this way, the system utilizes predictive analytics to determine best mode or best practice for savings for the bank and customer. For first time customers, the system may perform analytics to identify the optimal delivery date for the statement from the customer to the carrier route. The system can also adjust individual delivery date to maximize the delivery for a location, customer, or the like across the bank.

Embodiments of the invention relate to systems, methods, and computer program products for intelligent systematic physical document fulfillment, the invention comprising: identifying one or more required physical document distributions for a user; establishing communicable linkage with third party servers and a user device associated with the user; retrieving data via the communicable linkage for predictive analytics; reviewing factors retrieved from the communicable linkage; performing predictive analytics on real-time data flow from communicable linkage, wherein predictive analytics weighs the factors against regulatory compliance for physical document distribution; determining an optimized document printing and distribution date; and requesting printing and distributing of the physical documents based on the optimized document printing and distribution date.

In some embodiments, performing predictive analytics further comprises identifies a regulatory required date for the physical document distribution and weighing the factors against the regulatory required data to identify a cost efficient physical document distribution for a geographic location associated with the user.

In some embodiments, the factors include one or more carrier information, geographic information, regulatory compliance requirements, cost analytics, and/or user analytics.

In some embodiments, retrieving data from the user device further comprises retrieving data related to user document retention, user document visualization, and user resource distribution history.

In some embodiments, retrieving data from the third party servers further comprises retrieving data from postal services, weather agencies, media outlets, and supply/distribution channels that influence distribution of the physical documents.

In some embodiments, the invention further comprises identifying one or more physical documents requiring distribution to a geographic location associated with the user, wherein the geographical location associated with the user is a geographic location of a same postal carrier.

In some embodiments, the optimized document printing and distribution date is an optimized distribution date for the physical document based on regulatory compliance, user requests, and bulk distribution.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
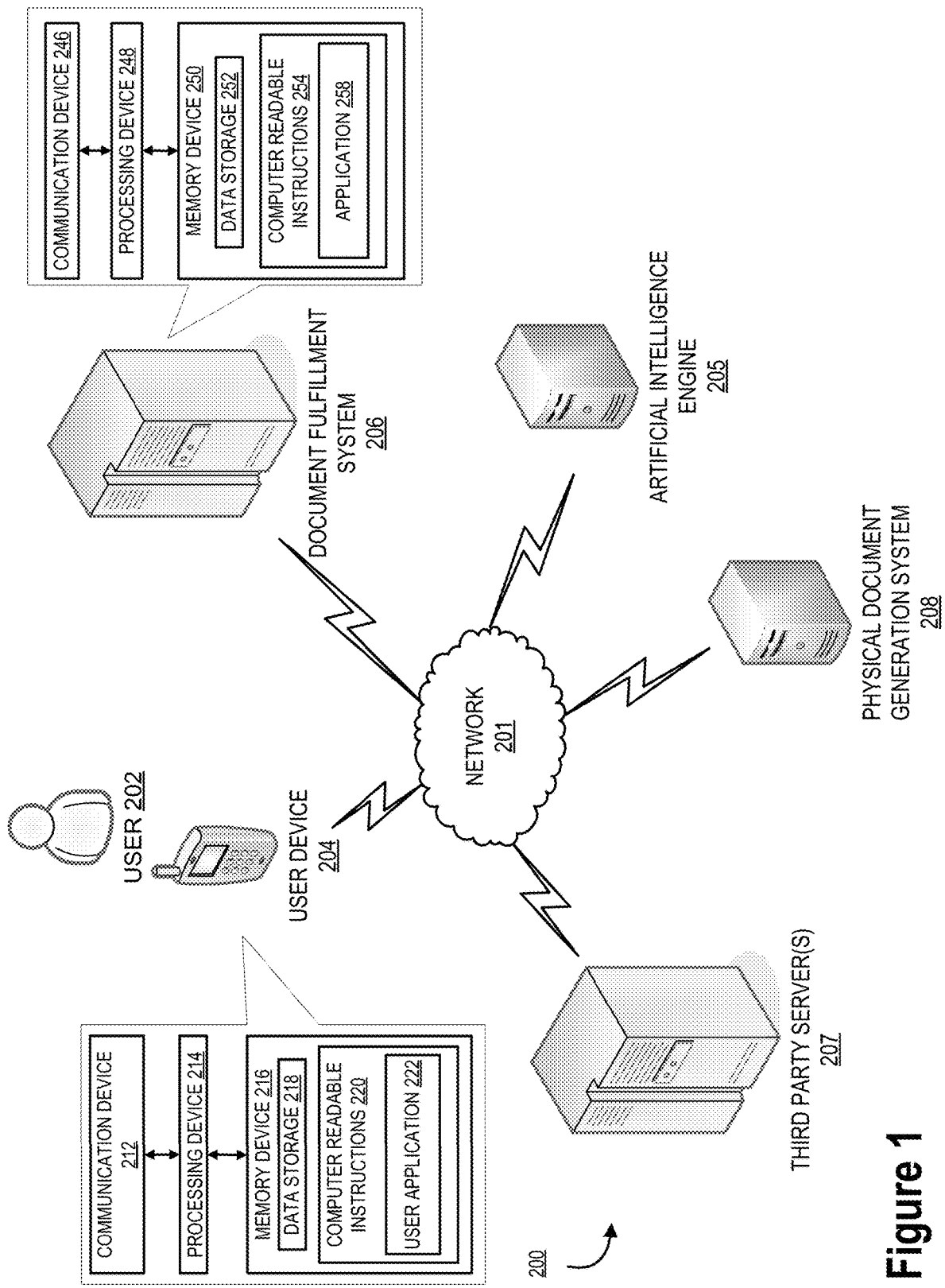
Figure 2:
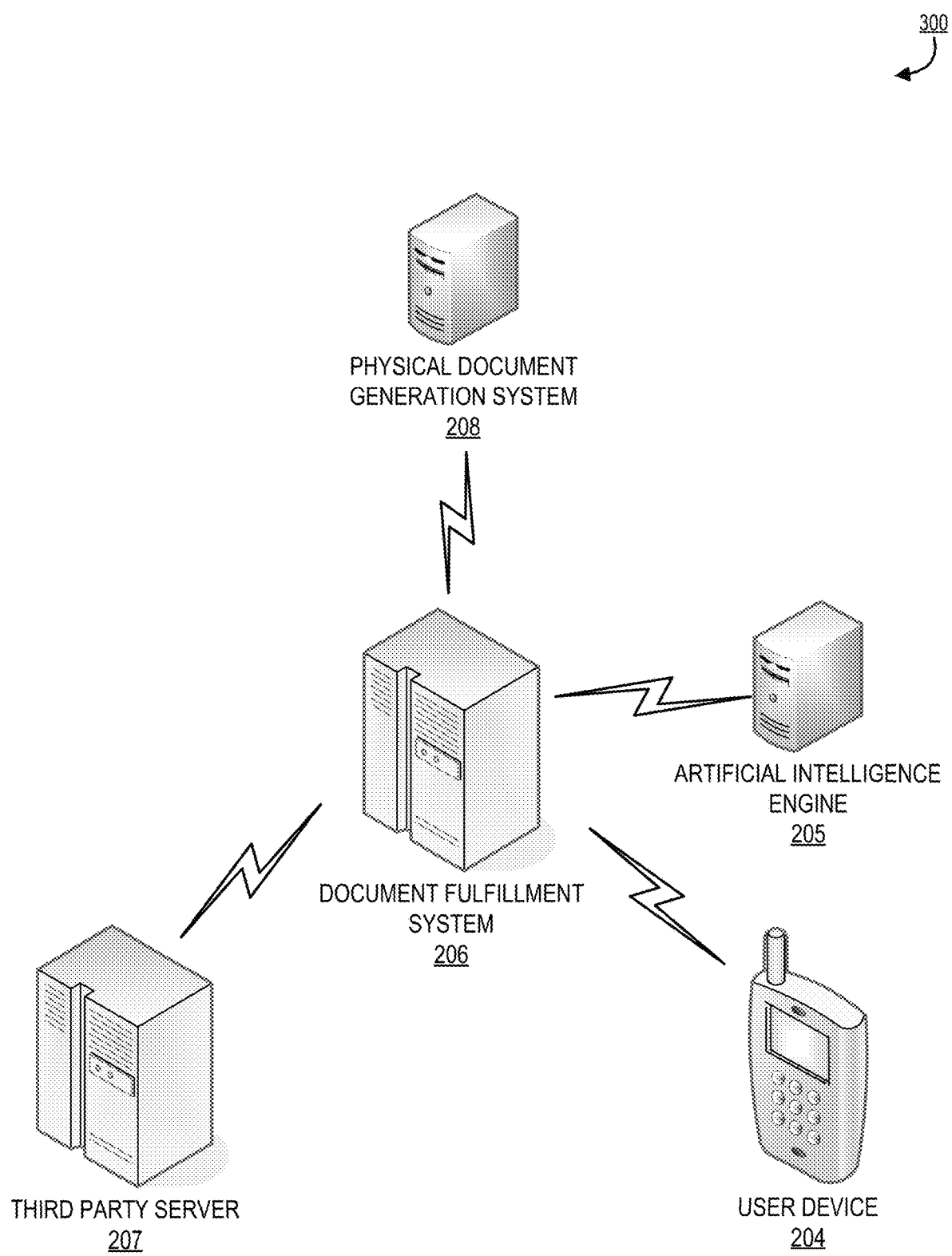
Figure 3:
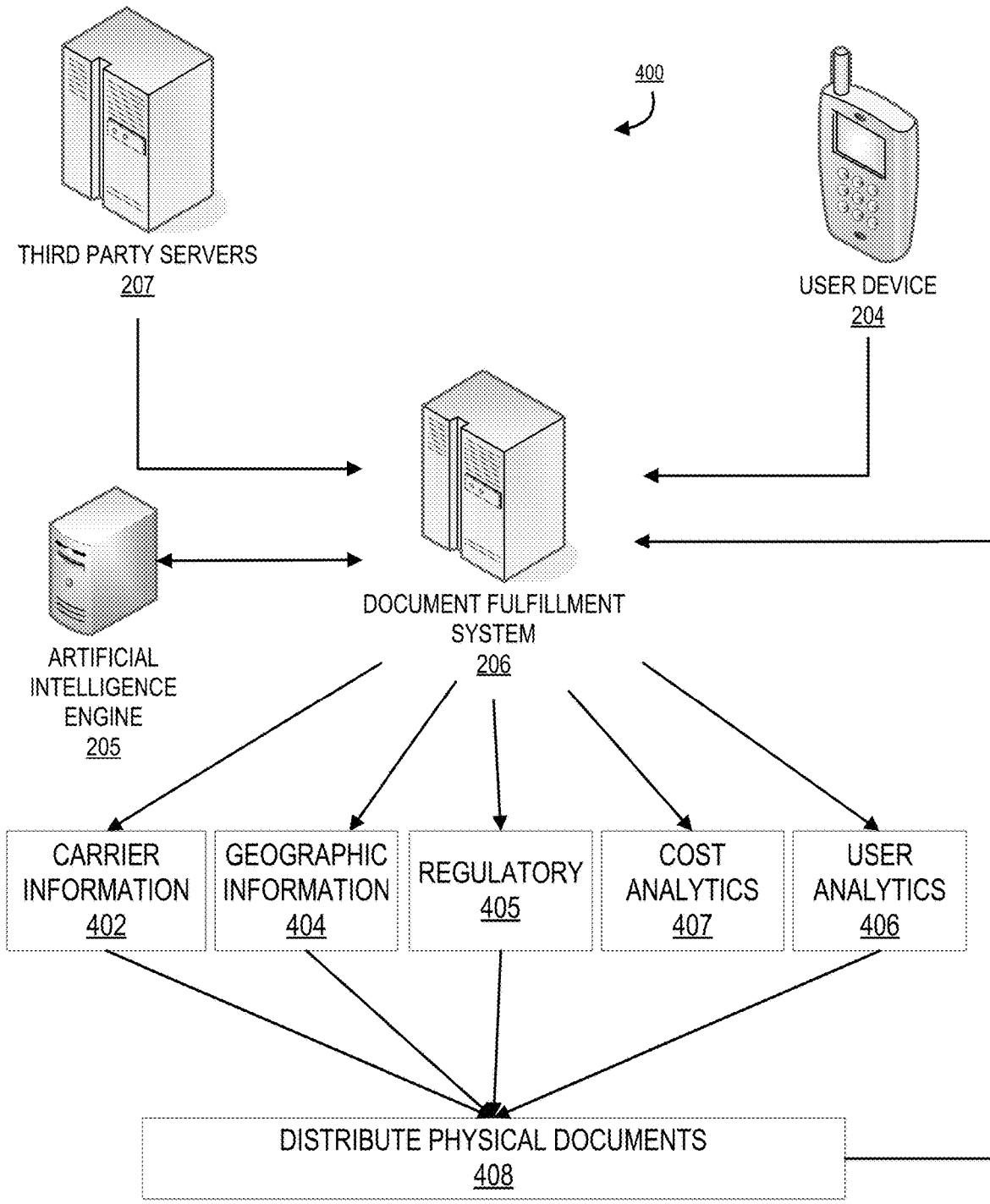
Figure 4:
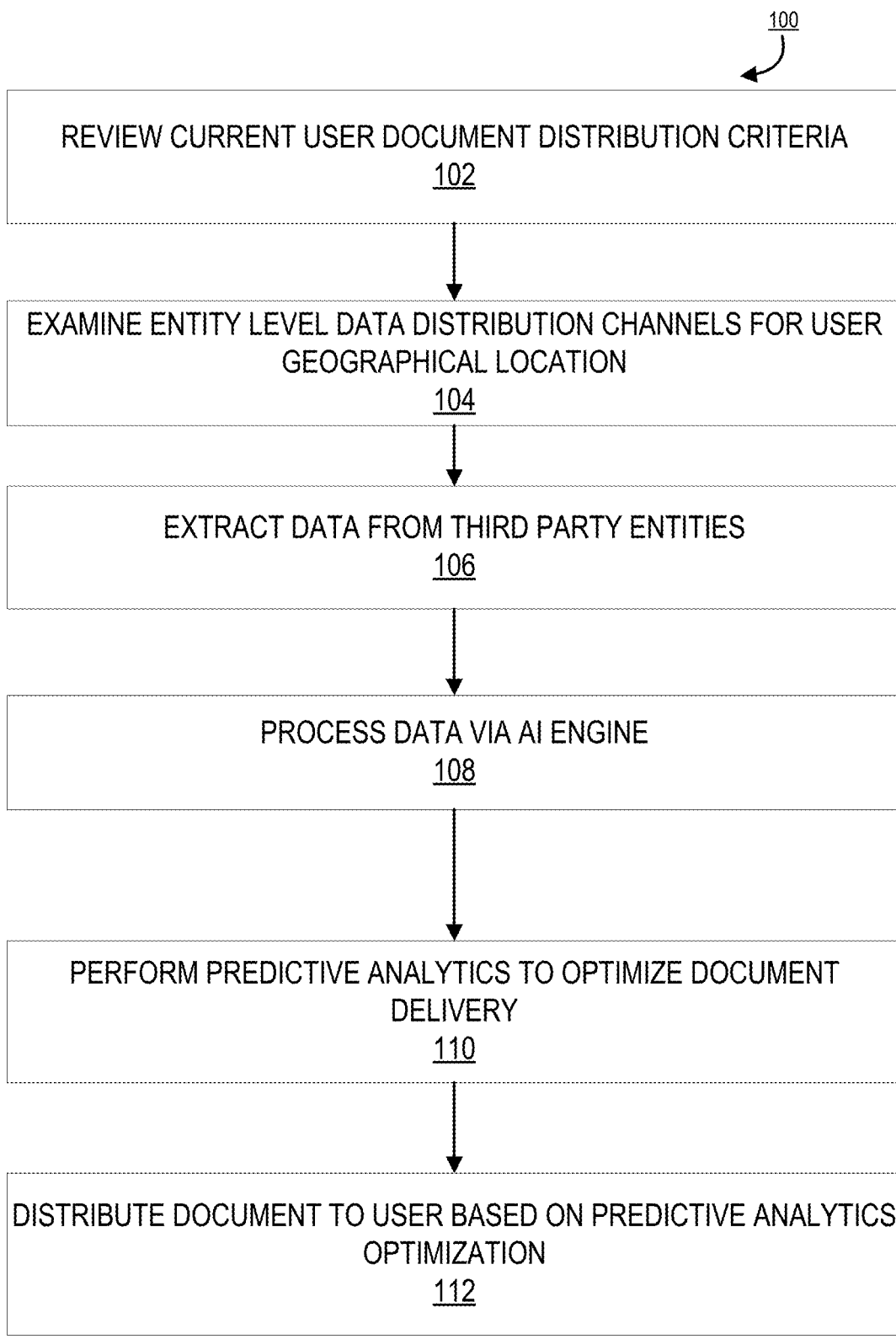
Figure 5:
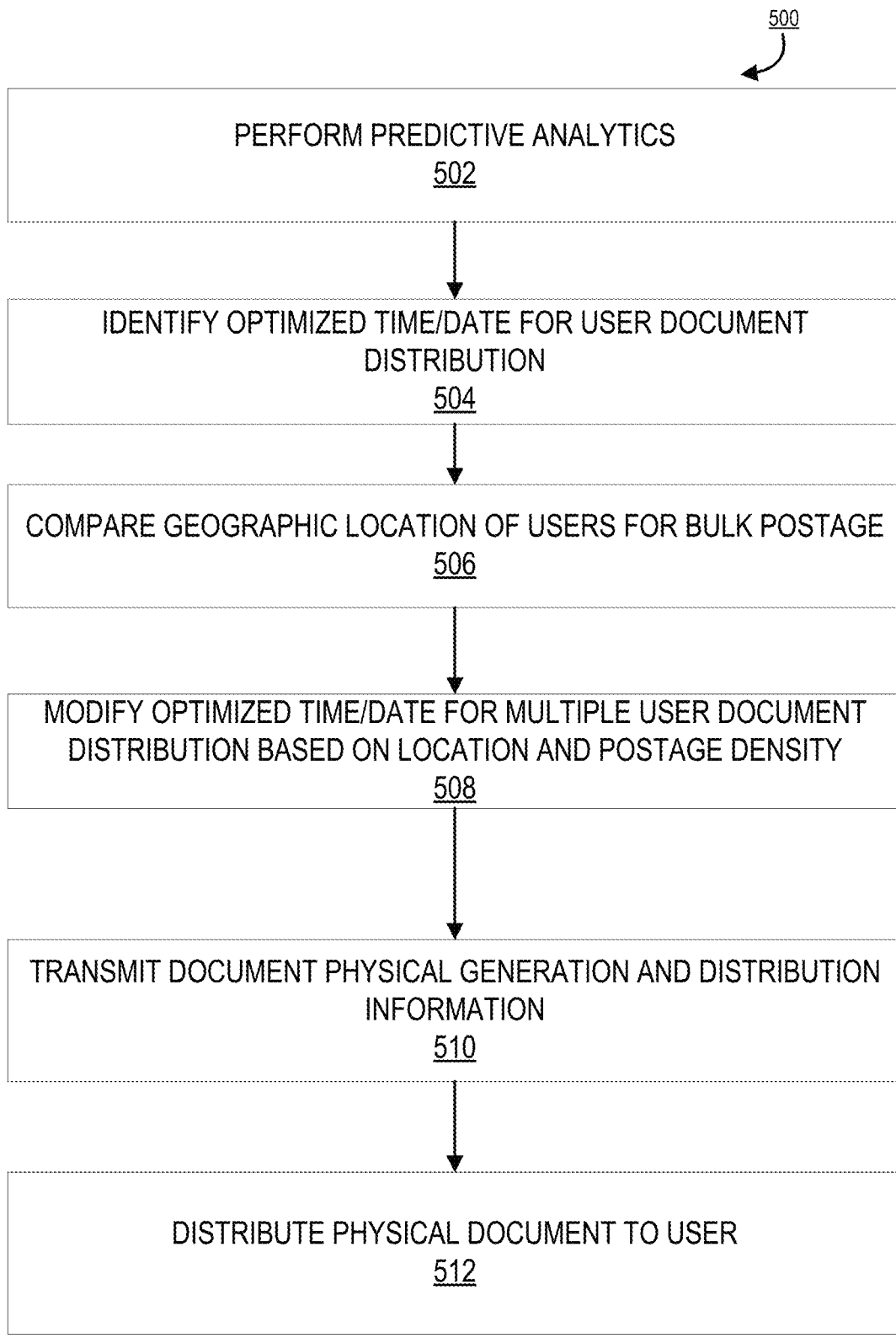
Figure 6:
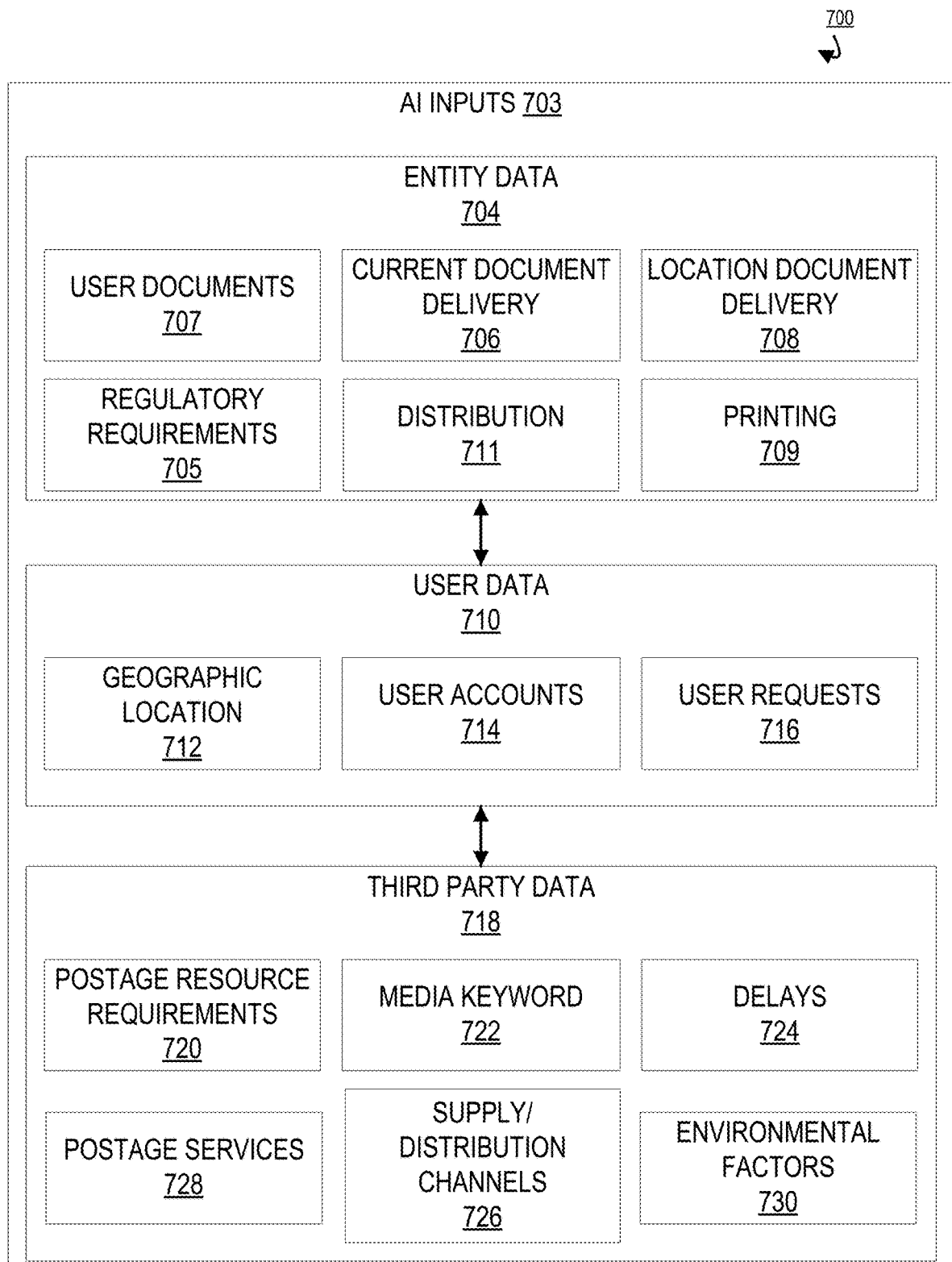

Having thus described embodiments of the invention in general terms, reference will now be made to the accompanying drawings, wherein:

FIG. 1 provides an intelligent systematic physical document fulfillment system environment, in accordance with one embodiment of the present invention;

FIG. 2 provides a communication linkage for the intelligent systematic physical document fulfillment system environment, in accordance with one embodiment of the present invention;

FIG. 3 provides a document generation and deployment system architecture environment, in accordance with one embodiment of the present invention;

FIG. 4 provides a high level process flow illustrating intelligent systematic physical document fulfillment processing, in accordance with one embodiment of the present invention;

FIG. 5 provides a process map illustrating document generation and distribution via the intelligent systematic physical document fulfillment system, in accordance with one embodiment of the present invention; and FIG. 6 provides a process map illustrating artificial intelligence implementation into document fulfillment processing, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. In some embodiments, the user may be an entity. In some embodiments, identities of an individual may include online handles, usernames, aliases, family names, maiden names, nicknames, or the like. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "transaction" or "resource distribution" refers to any communication between a user and the financial institution or other entity to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

FIG. 1 illustrates an intelligent systematic physical document fulfillment system environment 200, in accordance with one embodiment of the present invention. FIG. 1 provides the system environment 200 for which the distributive network system with specialized data feeds associated with document fulfillment and management. FIG. 1 provides a unique system that includes specialized servers and system communicably linked across a distributive network of nodes required to perform the functions described herein.

As illustrated in FIG. 1, the physical document generation system 208 is operatively coupled, via a network 201 to the user device 204, artificial intelligence engine 205, third party servers 207, and to the document fulfillment system 206. In this way, the physical document generation system 208 can send information to and receive information from the user device 204, artificial intelligence engine 205, third party servers 207, and the document fulfillment system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204 and is receiving physical documents from the document fulfillment system. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the document fulfillment system 206, the physical document generation system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the document fulfillment system 206.

As further illustrated in FIG. 1, the document fulfillment system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the physical document generation system 208, the third party server 207, the artificial intelligence engine 205, and the user device 204. As such, the communication device 246 generally comprises a modem, server, or other device for communicating with other devices on the network 201.

As further illustrated in FIG. 1, the document fulfillment system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the document fulfillment system 206 the memory device 250 stores an application 258. In one embodiment of the invention, the application 258 may associate with applications having computer-executable program code that generate and code a tag for implementation onto a product. Furthermore, the document fulfillment system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more physical document generation system 208, third party servers 207, artificial intelligence engine 205, and/or user device 204.

As illustrated in FIG. 1, the third party server 207 is connected to the physical document generation system 208, user device 204, artificial intelligence engine 205, and document fulfillment system 206. The third party server 207 has the same or similar components as described above with respect to the user device 204 and the document fulfillment system 206. While only one third party server 207 is illustrated in FIG. 1, it is understood that multiple third party servers 207 may make up the system environment 200. The third party server 207 may be associated with one or more financial institutions, physical mail carriers, weather centers, product providers, marketers, regulators, resource allocators, and the like.

As illustrated in FIG. 1, the artificial intelligence engine 205 is connected to the physical document generation system 208, user device 204, third party server 207, and document fulfillment system 206. The artificial intelligence engine 205 has the same or similar components as described above with respect to the user device 204 and the document fulfillment system 206. While only one artificial intelligence engine 205 is illustrated in FIG. 1, it is understood that multiple artificial intelligence engine 205 may make up the system environment 200. The artificial intelligence engine 205 may comprise a separate twin artificial intelligence (AI) engine continually monitors factors for deployment of physical documents. As such, this serves as a proxy to conscious decisions making process assessing the future deployment of physical documents to the user.

As illustrated in FIG. 1, the physical document generation system 208 is connected to the third party server 207, user device 204, artificial intelligence engine 205, and document fulfillment system 206. The physical document generation system 208 may be associated with the document fulfillment system 206 or a third party vender that prints the physical documents for distribution and deployment. The physical document generation system 208 has the same or similar components as described above with respect to the user device 204 and the document fulfillment system 206. While only one physical document generation system 208 is illustrated in FIG. 1, it is understood that multiple physical document generation system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The physical document generation system 208 may generally include a processing device communicably coupled to devices as a memory device, output devices, input devices, a network interface, a power source, one or more chips, and the like. The physical document generation system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the physical document generation system 208 described herein.

FIG. 2 illustrates a communication linkage for the intelligent systematic physical document fulfillment system environment 300, in accordance with one embodiment of the present invention. As illustrated, the document fulfillment system 206 is linked via a communicable linkage to the third party servers 207 and the user device 204. Furthermore, the document fulfillment system 206 is directly in communication with the artificial intelligence engine 205 to continually distribute data to the artificial intelligence engine 2005 for intelligent systematic physical document generation.

The document fulfillment system 206 may extract information from a third party server 207 and the user device 204. The document fulfillment system 206 reviews when a statement is printed, when it arrives at a user, how long it takes to be delivered, external environmental factors, SLA requirements for the statement, geographic location, keywords identification in media, supply/distribution channels, and the like. Combining this information with identifying delays in postage services, third party delays, volume discounts for postage, internal combination of multiple statements to one user, or the like. Using this information, the artificial intelligence engine 205 may learn and predict for the printing and distribution of mailings systematically for the best value for the entity and/or the user.

In some embodiments, the document fulfillment system 206 may extract information from the user device 204. This information may be data related to user document retention, user document visualization, user resource distribution history, and the like. As such, the document fulfillment system 206 may distribute the data to the artificial intelligence engine 205 in order to identify a time a preferred time and deliver of one or more documents. The document fulfillment system 206 may determine if multiple documents from one or more accounts may be distributed to the user and provide all of the documents in a single mailing.

In some embodiments, the document fulfillment system 206 may also extract information from the third party servers 207. Third parties may include mail carriers, weather agencies, postage services, media, supply/distribution channels, and the like that may influence the distribution of physical documents or influence a user timing of obtaining the documents upon delivery.

Using this information, the artificial intelligence engine 205 may learn and predict for communicating with the physical document generation system 208 for printing and distribution of mailings systematically for the best value for the entity and/or the user.

FIG. 3 illustrates a document generation and deployment system architecture environment 400, in accordance with one embodiment of the present invention. The document fulfillment system 206 may receive data from third party servers 207 and a user device 204.

As illustrated, the third party server 207 and the user device 204 may provide the document fulfillment system 206 with information in the form of data packets that includes information about the entities and users. In some embodiments, the document fulfillment system 206 may communicate directly with the artificial intelligence engine 205 to provide the artificial intelligence engine 205 with data, inflows, outflows, and the like in continuous communication for the artificial intelligence engine 205 to perform predictive analytics to determine a best mode or best practice for the distribution of physical documents that satisfy the user expectations, regulatory compliance, and is most cost efficient for the entity. In this way, a predicted analytics is performed on user data and third party data and is used in conjunction with regulatory compliance factors to identify a time frame to print and distribute the documents to the user. The analytics views a single user and multiple users within the similar location to predict the most cost effective balk distribution of physical documents to a geographic location.

In some embodiments, the predictive analytics may be performed via the artificial intelligence engine 205. In some embodiments, the document fulfillment system 206 may not require artificial intelligence to perform the predictive analytics and instead rely on business rules, data digestion, associate input, user input, or the like.

The document fulfillment system 206 may extract information from a third party server 207 and the user device 204. The document fulfillment system 206 reviews when a statement is printed, when it arrives at a user, how long it takes to be delivered, external environmental factors, SLA requirements for the statement, geographic location, keywords identification in media, supply/distribution channels, and the like. Combining this information with identifying delays in postage services, third party delays, volume discounts for postage, internal combination of multiple statements to one user, or the like. Using this information, the artificial intelligence engine 205 may learn and predict for the printing and distribution of mailings systematically for the best value for the entity and/or the user.

In some embodiments, the document fulfillment system 206 may extract information from the user device 204. This information may be data related to user document retention, user document visualization, user resource distribution history, and the like. As such, the document fulfillment system 206 may distribute the data to the artificial intelligence engine 205 in order to identify a time a preferred time and deliver of one or more documents. The document fulfillment system 206 may determine if multiple documents from one or more accounts may be distributed to the user and provide all of the documents in a single mailing.

In some embodiments, the document fulfillment system 206 may also extract information from the third party servers 207. Third parties may include mail carriers, weather agencies, postage services, media, supply/distribution channels, and the like that may influence the distribution of physical documents or influence a user timing of obtaining the documents upon delivery.

Using the artificial intelligence engine 205, the document fulfillment system 206 reviews factors received from or extracted from the third party servers 207 and the user device 204. These factors may include one or more carrier information 402, geographic information 404, regulatory compliance 405, cost analytics 407, and/or user analytics 406. Using these digested factors, the document fulfillment system 206 may continually provide data points in real-time to the artificial intelligence engine 205 for predictive analytics to determine a best mode or best practice for the distribution of physical documents that satisfy the user expectations, regulatory compliance, and is most cost efficient for the entity.

In some embodiments, carrier information 402 comprises information about national and local postal carriers that may influence the physical document and when it arrives at a user, how long it takes to be delivered, external environmental factors, geographic location, supply/distribution channels, and the like associated with the distribution of the physical documents. As such, the system may identify speeds of national and local postal carriers, costs of those carriers, including if there are bulk discount for document distribution, external delays such as low staffing or the like, and the like. The system may review all of the carrier information 402 and perform predictive analytics to determine when a document will be received by a user and if multiple documents are distributed within the location associated with the carrier if a resource savings may be provided based on bulk discount for document distribution.

In some embodiments, geographic information 404 comprises information about the geographical area associated with the user. In this way, the system may identify the geographic location associated with the user, the carriers in that location, the other users in that location, and the like. This way, the system may be able to print and distribute around that location at the same or similar time, which could lead to resource savings. Furthermore, the system may continually monitor local media in the geographic area to identify weather patterns, natural disasters, or the like that may influence the delivery of the physical documents to the users in that geographic location.

In some embodiments, regulatory compliance 405 may include any regulatory or service level agreements (SLA) required for delivery of the physical documents. For example, in the financial space, regulations require financial institutions to distribute physical documents to users at given time intervals. Furthermore, the individual entity distributing the physical documents may have an SLA in place and require the user be provided the physical document at a specific time. As such, the system may identify these regulatory compliances, SLAs, and the like and conform the distribution of the physical documents to the user by those deadlines.

In some embodiments, cost analytics 407 may be performed by the system in order to determine a most cost efficient distribution. In this way, the system reviews for bulk carrier discounts, location distribution discounts, or the like in order to distribute the physical documents in a resource efficient manner to a geographic location. This may also include providing a user with multiple documents within one physical mailing.

In some embodiments, user analytics 406 may include information about the user. This may include information about when the user picks up physical mail, a preferred mailing deliver date for the user, preferred carrier for the mailing, and the like. For example, if the mailing is a credit card statement, the system may identify when the user typically pays his/her credit card and will distributed the statement a specific time period before that day. This way, the distribution and delivery of the physical document corresponds to the user.

After the system reviews factors, including one or more carrier information 402, geographic information 404, regulatory compliance 405, cost analytics 407, and/or user analytics 406 received from or extracted from the third party servers 207 and the user device 204, the system may request the printing and distributing of the physical documents based on the determined predictive analytics, as illustrated in block 408. As illustrated, a feedback loop exists feeding back to the document fulfillment system 206 to provide continuous adjustments and service level modifications for the distribution of physical documents.

FIG. 4 provides a high level process flow illustrating intelligent systematic physical document fulfillment processing 100, in accordance with one embodiment of the present invention. The invention utilizes artificial intelligence (AI) processing to process mailings systematically for best postage density, value, timing, or the like. In this way, the system is a smart document fulfillment services (DFS) system that triggers specific printing and postage timing for physical mailings. The system reviews when a statement is printed, when it arrives at a user, how long it takes to be delivered, external environmental factors, SLA requirements for the statement, geographic location, keywords identification in media, supply/distribution channels, and the like. Combining this information with identifying delays in postage services, third party delays, volume discounts for postage (with zip code), internal combination of multiple statements to one user, or the like. Using this information, AI may learn and predict for the printing and distribution of mailings systematically for the best value for the entity and/or the customer. In this way, the system utilizes predictive analytics to determine best mode or best practice for savings for the bank and customer. For first time customers, the system may perform analytics to identify the optimal delivery date for the statement from the customer to the carrier route. The system can also adjust individual delivery date to maximize the delivery for a location, customer, or the like across the bank.

As illustrated in block 102, the process 100 is initiated by reviewing the current user document distribution criteria. The user document distribution criteria may include information about when the user picks up physical mail, a preferred mailing deliver date for the user, preferred carrier for the mailing, and the like. In may also include when the physical documents currently arrive at a user, how long the documents take to be delivered, external environmental factors, SLA requirements for the statement, geographic location, and the like. The physical documents may be one or more mailings to an address associated with the user, these documents may include financial documents, account documents, statements, or the like.

As illustrated in block 104, the process 100 continues by examining entity level data distribution channels for user geographic location. In this way, the system may review postal carriers as distribution channels in the geographic location of the user that may influence the physical document and when it arrives at a user, how long it takes to be delivered, external environmental factors, geographic location, supply/distribution channels, and the like associated with the distribution of the physical documents. As such, the system may identify speeds of national and local postal carriers, costs of those carriers, including if there are bulk discount for document distribution, external delays such as low staffing or the like, and the like. Furthermore, the system may review internal entity SLA and regulatory compliance requirements for the delivery of the physical documents. As such, the system may identify these regulatory compliances, SLAs, and the like and conform the distribution of the physical documents to the user by those deadlines. Finally, the system may preform cost analytics from the entity perspective to determine the most cost effective overall distribution timing for printing and distributing the documents to the user and other users.

Next, as illustrated in block 106, the process 100 continues by extracting data from third party entities. Third parties may include mail carriers, weather agencies, postage services, media, supply/distribution channels, and the like that may influence the distribution of physical documents or influence a user timing of obtaining the documents upon delivery. The data that is received or extracted that includes factors such as one or more carrier information, geographic information, regulatory compliance requirements, cost analytics, and/or user analytics may be processed via the artificial intelligence engine, as illustrated in block 108. The artificial intelligence engine may receive the data in real-time or near real-time to process via predictive analytics to determine the best mode or best practice for the distribution of physical documents that satisfy the user expectations, regulatory compliance, and is most cost efficient for the entity. As illustrated in block 110, the process 100 continues by performing the predictive analytics to optimize the document deliver. The predictive analytics may be performed and an optimized document printing and distribution date will be determined.

Next, as illustrated in block 112, the system may distribute the document to the user based on predictive analytics optimization. The optimized document printing and distribution date is determined on a continuum based on the received and extracted data from third parties and the user. The optimized document printing and distribution date must first meet regulatory compliance. After that, the other factors, such as one or more carrier information, geographic information, cost analytics, and/or user analytics are weighed equally to determine the optimized document printing and distribution date.

Furthermore, the invention provides an associate controlled control module via a user interface (UI) in order to override, intervene, program, or otherwise control the distribution of the physical documents for tolerance and systematic controlling of the distribution.

FIG. 5 provides a process map illustrating document generation and distribution via the intelligent systematic physical document fulfillment system 500, in accordance with one embodiment of the present invention. As illustrated in block 502, the process 500 is initiated by performing predictive analytics. The predictive analytics are utilized to determine a best mode or best practice for the distribution of physical documents that satisfy the user expectations, regulatory compliance, and is most cost efficient for the entity.

As illustrated in block 504, the predictive analytics generate an identification of an optimized time/date for user document distribution. This optimized time/date is the optimized document printing and distribution date and time. In some embodiments, the system may determine the optimized document printing and distribution date and time for the user and other individuals requiring physical document distribution. At that point, the system may compare the geographic location of all of the users requiring physical document distribution for potential resource savings via bulk postage, as illustrated in block 506.

Next, as illustrated in block 508, the process 500 continues by modifying the optimized time/date for multiple user document distribution based on locations and postage density for obtaining bulk postage rates. The documents are then transmitted for physical generation and distribution, as illustrate in block 510. In some embodiments, the system may queue and process the generation and distribution of the physical documents. In some embodiments, the system may transmit the generation and distribution of the physical documents to a third party for printing and distribution.

Finally, as illustrated in block 512, the process 500 is completed by distributing the physical documents to the users. Furthermore, the invention provides an associate controlled control module via a user interface (UI) in order to override, intervene, program, or otherwise control the distribution of the physical documents for tolerance and systematic controlling of the distribution.

FIG. 6 provides a process map illustrating artificial intelligence implementation into document fulfillment processing 700, in accordance with one embodiment of the present invention. As illustrated the artificial intelligent engine receives inputs 703. These inputs may include entity data 704, user data 710, and third party data 718. The inputs may be received or extracted in real-time or near real-time for processing and performing of predictive analytics to determine a best mode or best practice for the distribution of physical documents that satisfy the user expectations, regulatory compliance, and is most cost efficient for the entity.

In some embodiments, entity data 704 may be an artificial intelligent engine input. Entity data may include, the user documents 707 that have been distributed in the past and the documents that need to be distributed in the future. A current document deliver 706 schedule and if there are any user requested document delivery schedules. Location document deliver 708 includes the location the user desires delivery of the documents and where it is a home address, vacation address, post office box, leasing address, or the like. Regulatory requirements 705, such as SLA requirements or regulatory requirements for the delivery time and date of the physical documents. Distribution 711 includes the current channels the system uses to distribute the documents and any user specified distribution means. Finally, the entity data 704 may include where and who prints 709 the statement for the user.

In some embodiments, user data 710 may be an artificial intelligent engine input. User data 710 may include the geographic location of the user 712. In this way, the system may identify other users within the same geographic location for delivery of one or more physical documents via the same carrier at the same time. User accounts 714 include the accounts the user has with the entity. This may determine a number of physical documents the user may be receiving in a time period. Finally, user data 710 may include user requests 716. The user may request when he/she wishes to receive the physical documents. In some embodiments, new users may be asked preferences about receiving physical documents and or the user may request a change to a delivery date or location for the documents.

In some embodiments, third party data 718 may be an artificial intelligent engine input. Third party data 718 includes postage resource requirements 720 such as the costs, logistics, requirements, and the like for postage payment and delivery. Media keywords 722 includes identifying keywords from third party media sources that may indicate a delay in physical document delivery based on weather, environmental factors, or another incident. Delays 724 may include any delays that may be identified by monitoring third party activity, such as postage delivery delays, weather delays, or the like. Postage services 728 includes monitoring third party data 718 associated with postage carriers. Supply/distribution channels 726 includes monitoring the physical document supply and distribution chain such as printers, paper suppliers, postage carriers, and the like. Finally, the third party data 718 may include environmental factors 730, that may delay or otherwise effect the optimized document printing and distribution date.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent systematic physical document fulfillment, the system comprising:
    a memory device with computer-readable program code stored thereon;
    a communication device;
    a processing device operatively coupled to the memory device and the communication device, wherein the processing device is configured to execute the computer-readable program code to:
        identify one or more physical document for distribution for a user;
        establish communicable linkage with third party servers and a user device associated with the user;
        retrieve data via the communicable linkage for predictive analytics from the user device and the third party servers, wherein retrieving data from the user device further comprises retrieving data related to user document retention, user document visualization, and user resource distribution history;
        review factors retrieved from the communicable linkage;
        perform predictive analytics on real-time data flow from communicable linkage, wherein predictive analytics weighs the factors against regulatory compliance for physical document distribution;
        determine an optimized document printing and distribution date; and
        request printing and distributing of the physical documents based on the optimized document printing and distribution date.

2. The system of claim 1, wherein performing predictive analytics further comprises identifies a regulatory required date for the physical document distribution and weighing the factors against the regulatory required data to identify a cost efficient physical document distribution for a geographic location associated with the user.

3. The system of claim 1, wherein the factors include one or more carrier information, geographic information, regulatory compliance requirements, cost analytics, and/or user analytics.

4. The system of claim 1, wherein retrieving data from the third party servers further comprises retrieving data from postal services, weather agencies, media outlets, and supply/distribution channels that influence distribution of the physical documents.

5. The system of claim 1, further comprising identifying one or more physical documents requiring distribution to a geographic location associated with the user, wherein the geographical location associated with the user is a geographic location of a same postal carrier.

6. The system of claim 1, wherein the optimized document printing and distribution date is an optimized distribution date for the physical document based on regulatory compliance, user requests, and bulk distribution.

7. A computer program product for intelligent systematic physical document fulfillment, the computer program product comprising at least one non-transitory computer-readable medium having computer-readable program code portions embodied therein, the computer-readable program code portions comprising:
- an executable portion configured for identifying one or more physical document for distribution for a user;
- an executable portion configured for establishing communicable linkage with third party servers and a user device associated with the user;
- an executable portion configured for retrieving data via the communicable linkage for predictive analytics from the user device and the third party servers, wherein retrieving data from the user device further comprises retrieving data related to user document retention, user document visualization, and user resource distribution history;
- an executable portion configured for reviewing factors retrieved from the communicable linkage;
- an executable portion configured for performing predictive analytics on real-time data flow from communicable linkage, wherein predictive analytics weighs the factors against regulatory compliance for physical document distribution;
- an executable portion configured for determining an optimized document printing and distribution date; and
- an executable portion configured for requesting printing and distributing of the physical documents based on the optimized document printing and distribution date.

8. The computer program product of claim 7, wherein performing predictive analytics further comprises identifies a regulatory required date for the physical document distribution and weighing the factors against the regulatory required data to identify a cost efficient physical document distribution for a geographic location associated with the user.

9. The computer program product of claim 7, wherein the factors include one or more carrier information, geographic information, regulatory compliance requirements, cost analytics, and/or user analytics.

10. The computer program product of claim 7, wherein retrieving data from the third party servers further comprises retrieving data from postal services, weather agencies, media outlets, and supply/distribution channels that influence distribution of the physical documents.

11. The computer program product of claim 7, further comprising an executable portion configured for identifying one or more physical documents requiring distribution to a geographic location associated with the user, wherein the geographical location associated with the user is a geographic location of a same postal carrier.

12. The computer program product of claim 7, wherein the optimized document printing and distribution date is an optimized distribution date for the physical document based on regulatory compliance, user requests, and bulk distribution.

13. A computer-implemented method for intelligent systematic physical document fulfillment, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
- identifying one or more physical document for distribution for a user;
- establishing communicable linkage with third party servers and a user device associated with the user;
- retrieving data via the communicable linkage for predictive analytics from the user device and the third party servers, wherein retrieving data from the user device further comprises retrieving data related to user document retention, user document visualization, and user resource distribution history;
- reviewing factors retrieved from the communicable linkage;
- performing predictive analytics on real-time data flow from communicable linkage, wherein predictive analytics weighs the factors against regulatory compliance for physical document distribution;
- determining an optimized document printing and distribution date; and
- requesting printing and distributing of the physical documents based on the optimized document printing and distribution date.

14. The computer-implemented method of claim 13, wherein performing predictive analytics further comprises identifies a regulatory required date for the physical document distribution and weighing the factors against the regulatory required data to identify a cost efficient physical document distribution for a geographic location associated with the user.

15. The computer-implemented method of claim 13, wherein the factors include one or more carrier information, geographic information, regulatory compliance requirements, cost analytics, and/or user analytics.

16. The computer-implemented method of claim 13, wherein retrieving data from the third party servers further comprises retrieving data from postal services, weather agencies, media outlets, and supply/distribution channels that influence distribution of the physical documents.

17. The computer-implemented method of claim 13, further comprising identifying one or more physical documents requiring distribution to a geographic location associated with the user, wherein the geographical location associated with the user is a geographic location of a same postal carrier.

* * * * *